(12) United States Patent
Biely et al.

(10) Patent No.: US 7,934,099 B2
(45) Date of Patent: Apr. 26, 2011

(54) DEVICE AND METHOD FOR GENERATING DIGITAL SIGNATURES

(75) Inventors: Helmut Biely, Weidling (AT); Klaus Dillinger, St. Pölten (AT)

(73) Assignee: BDC-EDV Consulting GmbH, Vienna (AT)

( * ) Notice: Subject to any disclaimer, the term of this patent is extended or adjusted under 35 U.S.C. 154(b) by 1065 days.

(21) Appl. No.: 11/711,795

(22) Filed: Feb. 27, 2007

(65) Prior Publication Data
US 2010/0042849 A1 Feb. 18, 2010

(30) Foreign Application Priority Data

Feb. 27, 2006 (AT) .................................. A 324/2006
Mar. 13, 2006 (AT) .................................. A 406/2006

(51) Int. Cl.
*H04L 9/32* (2006.01)
*G06F 7/04* (2006.01)
*G06F 15/16* (2006.01)
*G06F 17/30* (2006.01)
*H04L 29/06* (2006.01)

(52) U.S. Cl. ................................. 713/176; 726/9; 726/10
(58) Field of Classification Search .................... 713/176
See application file for complete search history.

(56) References Cited

U.S. PATENT DOCUMENTS

| 5,799,171 A * | 8/1998 | Kondou | 703/27 |
| 5,929,414 A * | 7/1999 | Saitoh | 235/380 |
| 6,371,376 B1 * | 4/2002 | Dan | 235/486 |
| 6,510,514 B1 | 1/2003 | Sedlak | |
| 2001/0045453 A1 * | 11/2001 | Devaux et al. | 235/380 |
| 2004/0243474 A1 * | 12/2004 | Vu et al. | 705/26 |
| 2006/0095598 A1 * | 5/2006 | Prevost et al. | 710/10 |
| 2007/0260544 A1 * | 11/2007 | Wankmueller | 705/44 |
| 2008/0040285 A1 * | 2/2008 | Wankmueller | 705/67 |
| 2008/0154770 A1 * | 6/2008 | Rutherford et al. | 705/44 |
| 2008/0285746 A1 * | 11/2008 | Landrock et al. | 380/29 |

FOREIGN PATENT DOCUMENTS

| JP | 2003099739 A * | 4/2003 |
| WO | WO 99/08415 | 2/1999 |
| WO | 2006/016852 A1 | 2/2006 |
| ZA | 9905796 A * | 5/2000 |

\* cited by examiner

*Primary Examiner* — Christian LaForgia
(74) *Attorney, Agent, or Firm* — Laurence A. Greenberg; Werner H. Stemer; Ralph E. Locher

(57) ABSTRACT

For the secure creation of digital signatures and/or for the secure authentication of users with a chip card, an apparatus is plugged into a computer and the PIN is input. The computer operating system activates the autorun function of a read drive in the apparatus and loads an http responder program into the computer. A standard http protocol is used to send a signature request containing all the signature data to the http responder, which writes these data to the interface memory area of a read/write drive in the apparatus, and said interface memory area is read by the internal software in the apparatus, which interprets the data and uses configuration data to check the admissibility of the instruction. If appropriate, the signature request is then forwarded via a chip card read/write apparatus to the chip card, and the signature created by the card is written to the interface memory area, from where it is read by the http responder and is made available to the application as an http response.

9 Claims, 1 Drawing Sheet

DEVICE AND METHOD FOR GENERATING DIGITAL SIGNATURES

CROSS-REFERENCE TO RELATED APPLICATION

This application claims the priority, under 35 U.S.C. §119, of Austrian application Nos. A 324/2006 filed Feb. 27, 2006 and A 406/2006, filed Mar. 13, 2006; the prior applications are herewith incorporated by reference in their entirety.

BACKGROUND OF THE INVENTION

Field of the Invention

The invention relates to a method for the secure creation of digital signatures and/or for the secure authentication of users using a specific apparatus connected to a computer, and also to the apparatus itself. The cryptographic keys and algorithms required for the signature/authentication are stored on a special chip card which is connected using a chip card reader, preferably integrated in the apparatus. The apparatus also preferably has an operating apparatus which the user needs to use to confirm security-critical operations, such as creating signatures, accessing restricted-access areas of the chip card or of the appliance, etc., before they are carried out. These operations are carried out only if the operating apparatus has been operated beforehand. In addition, the assembly's programming prevents so-called denial-of-service attacks.

Many applications in computer networks and on the Internet, for example Internet banking or Internet auctions, require the secure authentication of users and/or data. This is, at current, usually done using software-based methods such as user name with password or PIN combined with encrypted transmission (e.g. SSL). For increased security demands, transaction numbers (TAN) are usually employed in addition. From a cryptographic viewpoint, these are so-called single-use codes and therefore apply to just one respective transaction. All the cited methods are based on software implementations. They are therefore secure only provided that the user's computer is free of unauthorized programs (for example Trojans or viruses) which can spy out the data for the user identification and—unnoticed by the users—can transmit them to hackers. In addition, these methods assume that the user does not himself—with varying degrees of consciousness—forward his identification data to unauthorized parties. The two assumptions cannot be made today in practice, however. New Trojans become known almost daily, exploiting security gaps in operating systems and deliberately spying out identification data. Criminal organizations use what are known as "phishing e-mails" to trick unsuspecting users into disclosing their identification data and in this way to attack their accounts.

In recent years, countermeasures developed against these threats have been chip-card-based methods for authentication and for digital signatures. In the case of these methods, the cryptographic keys required for the signature are stored in a chip card in a form protected against reading. To implement a signature, the user needs to input a PIN which is checked by the card itself. The data to be signed are transferred to the card and are signed therein. On the basis of a card of this kind, secure authentication methods can be developed which solve a large portion of the aforementioned problems. However, they simultaneously give rise to a series of fresh problems.

To be able to use a chip card, it is necessary to use a card reader for chip cards. Card readers are divided into security classes, with higher classes meaning a higher level of security. The chip card readers currently available commercially may be divided into three classes.

A class 1 card reader is used merely as a channel for the card. The card reader does not take any action in the transparent card access from the PC. Every instruction is therefore forwarded directly to the card. The card reader may have a keypad and a display, but the latter is not under the exclusive control of the chip card reader, that is to say that the keypad and the display can be controlled remotely by the PC.

A class 2 card reader has a keypad which can at least intermittently be placed under the exclusive control of the card reader, i.e. the PC cannot "monitor" the data which are input there.

A class 3 card reader has a keypad and a, typically alphanumeric, display which are at least to some extent able to be placed under the exclusive control of the card reader, so that the PC cannot monitor the keypad inputs and cannot influence the display outputs. The keypad and the display are in that case controlled exclusively by the firmware of the card reader. Class 3 card readers are used when using chargeable smart cards (e.g., the GeldKarte in Europe) on the Internet or for displaying and confirming HBCI transfer data.

A fundamental weakness of chip-card-based authentication schemes is that the card's PIN is only secure against attacks if class 2 or 3 chip card readers are used. Otherwise, the PIN would be able to be tapped by Trojans or viruses in the user's computer, and the card which is in the reader would be able to be used without authorization with the aid of the PIN which has been tapped. In addition, the user must be instructed never to input his PIN on his computer's keypad but rather only ever on the card reader's keypad. Both aspects are a problem in practical operation and therefore make the security advantage obtained through the chip card implementation relative.

International patent application WO99/08415A solves this problem by virtue of the chip card reading unit being equipped with an operating element (e.g. a key) which always needs to be operated before a signature is created. This ensures that an unauthorized program in the user's computer cannot create any unauthorized signatures even if it knows the PIN and the card is in the reading unit.

Another problem of chip-card-based implementations is what are known as "denial-of-service attacks." This means attacks by unauthorized programs whose aim is to render the chip card permanently unusable. In addition to the protection by PINs and PUKs, many chip-card-based applications have the read and/or write access to individual files on the card protected cryptographically, i.e. it is dependent on the authentication using a cryptographic key. Both in the case of PIN/PUK and in the case of authentication using a cryptographic key, generally a particular number of incorrect attempts at the code or at authentication is followed by the card, or particular applications on the card, being irreversibly disabled for any further use. This mechanism is implemented in the card's operating system and is intended to prevent the code(s) for a card or the authentication key(s) being able to be found out using brute force attacks (simply trying). The only way of restoring the availability of the blocked application to the user is to replace the card or—if there is provision—to unlock it using a special key during a personal visit to specially equipped workstations. Both have associated high costs. This circumstance can be utilized by hackers using what is known as a "denial of service attack". This involves the hacker spreading a virus or other malicious software which deliberately renders chip cards used on affected systems unusable by performing verification attempts using deliberately incorrect PINs/PUKs or authentication attempts using deliberately incorrect keys until the card is unusable. An attack of this kind could effectively sabotage card-based systems for E-government, E-banking, E-health and the like and could cause considerable damage. The use of class 2 or 3 readers or of an apparatus based on the above-mentioned WO99/08415 does not solve these problems because in this case, although the PIN is possibly protected against unauthorized use, a denial of service attack on a PUK or authentication key for the card continues to be possible.

Another practical problem of chip-card-based systems is the driver installation connected to the card reader. Every card reader requires its own driver, which needs to be installed on the computer before use. This often has associated technical problems, as a result of which costs are increased and customer acceptance falls.

To be able to address a chip card from a browser-based Internet application, it is not sufficient merely to install a driver for the card reader. Either the Internet application needs to use active browser components or the user needs to install a suitable browser plugin. Active browser components are usually blocked by the browser's security settings, while the installation of plugins results in long download times and organizational problems. Both solution options therefore have associated organizational and technical problems in practice, and hence associated high costs for the application operators. In addition, they restrict the mobility of the signature functions, since the customer can only sign on a computer which has the relative settings/installations. Such applications therefore do not meet today's usual mobility requirements. Customers want to be able to perform their bank transactions from any PC (e.g. in the office, at home, Internet café, hotel, etc.).

For the reasons cited above, chip-card-based authentication solutions have not been able to be implemented on the mass market to date. Although there are already signature-compatible chip cards in widespread use (e.g. in Austria, the e-card in the social security sector, the Maestro card in the banking sector) and also the requisite certificate infrastructure exists (e.g. A Trust), the high costs and the lack of user friendliness of the card reader installations and also the greatly restricted mobility have prevented broad application to date—all this despite the doubtlessly existing massive security problems in many application areas, but particularly in Internet banking.

SUMMARY OF THE INVENTION

It is therefore the object of the present invention to provide an apparatus and a method for signature creation and authentication which solve the problems described above. It is a particular object to enable the apparatus and the method to be used for creating chip-card-based signatures and authentications without installing drivers and without active browser contents, and thus to provide unlimited mobility and user convenience. Suitable hardware and software mechanisms are intended to prevent both attacks through unauthorized use of the PIN and denial-of-service attacks and hence to provide maximum security both for the user and for the application operator.

With the above and other objects in view there is provided, in accordance with the invention, an apparatus for connection to a computer for the purpose of secure creation of digital signatures and/or for the purpose of secure authentication of users using cryptographic keys and algorithms stored on a chip card and required for the signature/authentication. The apparatus comprises:

a chip card read/write apparatus for connecting the chip card and an interface for connection to the computer using a protocol provided as standard in the computer's operating system;
a first drive (e.g., a simulated CD-ROM drive) for read operations, an http responder, and a second drive for read/write operations (e.g., a simulated, replaceable data storage medium);
an interface memory area for data interchange between the apparatus and the computer;
a table with configuration data in the form of data pairs including the chip card's ATR and commands to be blocked; and
internal software for controlling functions of the apparatus taking into account the configuration data and for facilitating communication between said interface memory area and said chip card read/write apparatus.

The inventive apparatus—in the following also called a signature dongle as a whole—is an integrated system comprising the following components: a chip card read/write device, preferably an operating element for preventing unauthorized use of the PIN, PUK and/or of the authentication keys for the chip card, an interface for connection to a computer using a protocol provided as standard in the computer's operating system (e.g. USB), and also suitable software components which firstly prevent denial-of-service attacks and secondly allow connection to computer applications without driver installation and active browser components.

In accordance with a preferred embodiment of the invention, the first drive and/or the second drive is/are simulated to the computer.

In accordance with an added feature of the invention, the chip card read/write apparatus is an integrated device.

In accordance with a concomitant feature of the invention, the apparatus includes an operating element enabling user input, and wherein the configuration data include data pairs with the chip card's ATR and security-critical commands to be confirmed via said operating element, and wherein the internal software is configured to control a functionality of the operating element taking into account the configuration data.

With the above and other objects in view there is also provided, in accordance with the invention, a method for the secure generation of digital signatures and/or for the secure authentication of users of the apparatus. The method which comprises:

providing an apparatus according to claim 1 and establishing communication between a computer and the apparatus;
in response to a prompt from an application on the computer, inputting a PIN, and activating, with the computer's operating system, an autorun function of the first drive for read operations and loading the http responder program into the computer;
using, with the application, standard http protocol to send a signature request containing data required for the signature, including the PIN, to the http responder, and writing the data to the interface memory area of the second drive for read/write operations with the http responder;
reading, with the internal software of the apparatus, the memory area and interpreting the data to check whether or not the desired instruction is admissible for the given card, and, if so:
forwarding, with the internal software, the signature request via the chip card read/write apparatus to the chip card, and writing the signature created by the card to the interface memory area; and reading the signature from the interface memory area by the http responder and making the signature available to the application as an http response.

In one variant of the invention, the chip card read/write unit may also be connected by way of a cable or short distance wireless (e.g., Bluetooth) communication.

Other features which are considered as characteristic for the invention are set forth in the appended claims.

Although the invention is illustrated and described herein as embodied in device and method for generating digital signature, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
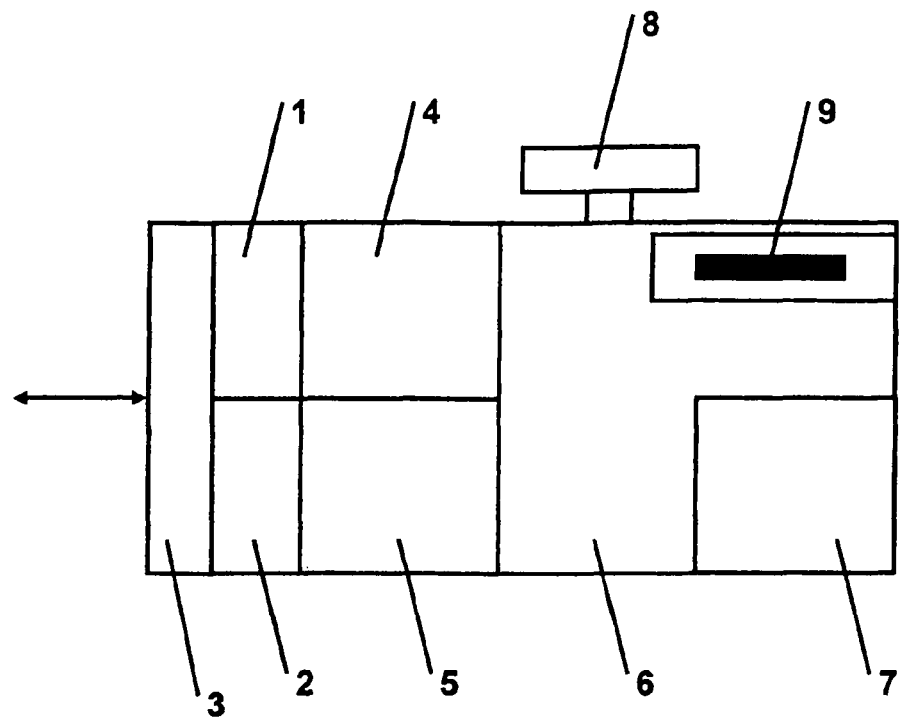
FIG. 1 shows the diagram for a preferred implementation of the apparatus according to the invention.

Referring now to the figures of the drawing in detail and first, particularly, to FIG. 1 thereof, there is shown a schematic design of the signature dongle (generically referred to as a security device). The signature dongle contains a chip card read/write apparatus 9 and an operating element 8. The signature dongle simulates two drives to the computer, namely a CD-ROM drive 1 for read operations and a replaceable data storage medium 2 for read/write operations. The connection is made by means of a standard protocol, preferably a USB interface 3. The simulated CD-ROM drive 1 contains a program, known as the http responder 4, which is intended for execution on the computer. The simulated replaceable data storage medium contains an interface memory area 5 which is used for the data interchange between the signature dongle and the computer, a table containing configuration data 7 which is used to prevent denial-of-service attacks, and an internal piece of software 6 for controlling the functions of the signature dongle and of the operating element 8 taking into account the configuration data 7 and for the communication between the memory area 5 and the chip card read/write apparatus 9.

Figure 2:
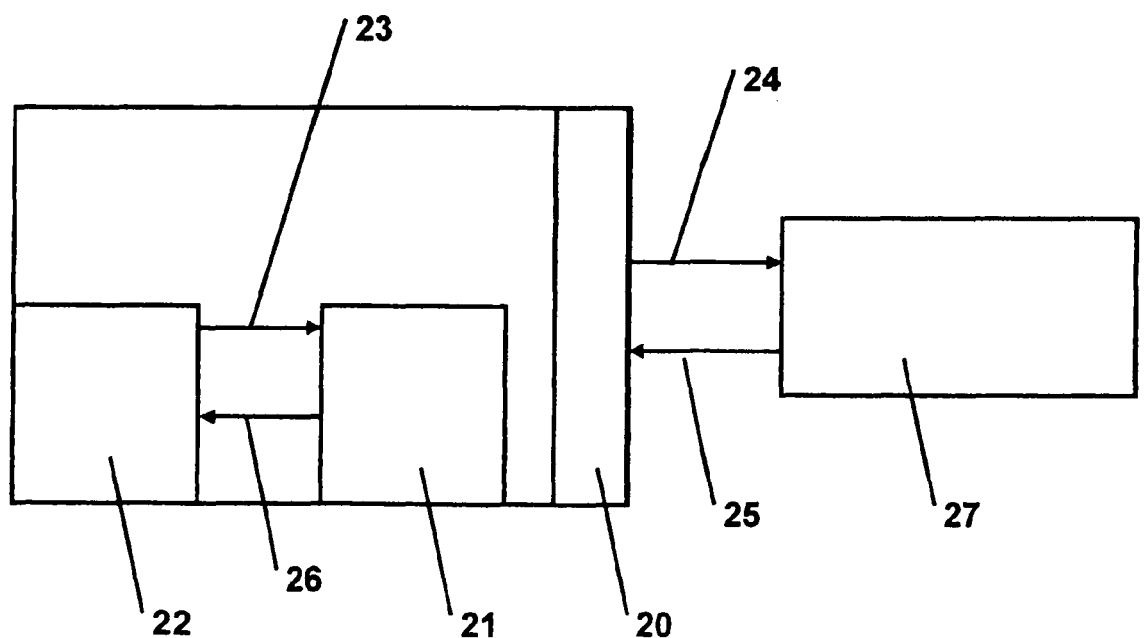
FIG. 2 shows the sequence diagram of a preferred implementation of the method according to the invention.

FIG. 2 shows the sequence of signature creation. From the technical point of view, there is no difference between the secure authentication of a user and the signing of data. In the first case, the login form is simply signed. We will therefore now consider the case of signature creation in the following text.

To implement a signature, the computer's application 22 asks the user to plug in the signature dongle and asks for input of the PIN. When the signature dongle has been plugged into the computer's interface 1, the operating system automatically activates the autorun function of the CD-ROM drive simulated by the signature dongle. This automatically loads the http responder program 4 stored on the signature dongle into the computer and starts it there 21. From the presence of the http responder program 21, the application 22 can tell that the signature dongle has been plugged in. The application 22 uses the standard http protocol to send a signature request 23 to the http responder 21. This request contains all the data required for the signature, including the PIN. The http responder 21 writes the data 24 required for implementing the signature to the interface memory area 5 of the replaceable data storage medium 2 simulated by the signature dongle. The internal software 6 of the signature dongle reads this memory area and interprets the data. It uses the configuration data 7 to check whether the desired instruction is actually admissible for this card, and if so whether confirmation is required from the user using the operating element 8. If confirmation by the user is required, the user needs to be asked to do this by the http responder 21. The internal software 6 writes this request to the interface memory area 5, from where it is read by the http responder 21, and then an appropriate request is displayed on the computer. The internal software 6 forwards the signature request to the chip card via the card read/write apparatus 9 only following confirmation by the user using the operating element 8. The signature created by the card is written back to the interface memory area 5, from where it is read 25 by the http responder 21. The application 22 receives the signature as an http response 26 from the http responder.

The protocol parameters such as port, URL, message structure and protocol for the communication between the http responder 21 and the application 22 are prescribed by the implementation of the http responder 21 and need to be observed by all applications which wish to use the functions of the signature dongle. This results in a quasi protocol standard for signatures.

The signature dongle is extended to new, previously unsupported chip cards by adjusting the http responder software 4 in the simulated CD-ROM drive 1 of the signature dongle.

The http responder 21 can be programmed such that it is automatically terminated as soon as the signature dongle 27 is removed from the computer.

The configuration data 7 stores information in the form of a data pair comprising the chip card's ATR and the security-critical command which is to be blocked or to be confirmed by means of the operating element 8. The ATR (Answer to Reset) identifies a series of chip cards distinctly and can therefore be used as an identification feature. The rules are respectively made available in up-to-date form by the manufacturer of the signature dongle and are provided as a download from an Internet page, for example. The user of the signature dongle loads the respective current configuration data onto his PC and can store these data in the signature dongle using a piece of software provided by the manufacturer of the signature dongle. The update for the rules in the configuration data can also be cryptographically protected against corruption (e.g. by means of digital signature of the rule entries).

In another embodiment of the invention, confirmation rules can also be stored in the configuration data in addition or as an alternative to the aforementioned blockade rules. The effect achieved by a confirmation rule is that for a card with a particular ATR, during an attempt at authenticated read or write access to a particular cryptographically stored file, confirmation using the operating element 8 is requested from the user. The signature dongle effects the requested access only if the user permits this as a result of confirmation using the operating element 8. The individual confirmation rules indicate which of the files can be stored on the card by user confirmation of this kind. This ensures that no software can make authentication attempts for files stored in this manner unnoticed by the user. For each chip card series (identified by the ATR), any number of rules can be stored.

The problem cited above is solved through the inventive interaction of the components described as follows:

The security of the PIN against unauthorized use and the security of the chip card against denial-of-service attacks are achieved by combining the combination data 7 with the operating element 8. The PIN is forwarded to the card only if the operating element 8 has been operated beforehand. This ensures that an unauthorized computer application does not use a PIN which has been input once to create signatures without authorization. Similarly, security-critical commands are forwarded to the card either not at all or only following confirmation by the operating element 8, depending on the configuration data. The card is therefore protected against deliberate destruction through intentionally incorrect PUK inputs, for example.

The use of a standard interface, preferably USB, in conjunction with the emulation of drives and the autorun function means that it is not necessary for any kind of software or drivers to be installed on the computer.

The fact that the software is in the form of an http responder means that the application does not require any active components. This means that any application which keeps to the protocol of the http responder can use the functions of the signature dongle without security restrictions and without installing plugins.

What is claimed is:

1. An apparatus for connection to a computer for the purpose of secure creation of digital signatures and/or for the purpose of secure authentication of users using cryptographic keys and algorithms stored on a chip card and required for the signature/authentication, the apparatus comprising:
 a chip card read/write apparatus for connecting the chip card and an interface for connection to the computer using a protocol provided as standard in the computer's operating system;
 a first drive for read operations, an http responder, and a second drive for read/write operations, at least one of the first and second drives being simulated to the computer;
 an interface memory area for data interchange between the apparatus and the computer;
 a table with configuration data in the form of data pairs including the chip card's ATR and commands to be blocked; and
 internal software for controlling functions of the apparatus taking into account the configuration data and for facilitating communication between said interface memory area and said chip card read/write apparatus.

2. The apparatus according to claim 1, wherein said chip card read/write apparatus is an integrated device.

3. The apparatus according to claim 1, wherein said first drive is a simulated CD-ROM drive.

4. The apparatus according to claim 1, wherein said second drive is a replaceable data storage medium.

5. The apparatus according to claim 1, which further comprises an operating element enabling user input, and wherein the configuration data include data pairs with the chip card's ATR and security-critical commands to be confirmed via said operating element, and wherein said internal software is configured to control a functionality of said operating element taking into account the configuration data.

6. A method for the secure generation of digital signatures and/or for the secure authentication, the method which comprises:
 providing an apparatus for connection to a computer for the purpose of secure creation of digital signatures and/or for the purpose of secure authentication of users using cryptographic keys and algorithms stored on a chip card and required for the signature/authentication, the apparatus including
  a chip card read/write apparatus for connecting the chip card and an interface for connection to the computer using a protocol provided as standard in the computer's operating system;
  a first drive for read operations, an http responder, and a second drive for read/write operations, at least one of the first and second drives being simulated to the computer;
  an interface memory for data interchange between the apparatus and the computer;
  a table with configuration data in the form of data pairs including the chip card's ATR and commands to be blocked; and
  internal software for controlling functions of the apparatus taking into account the configuration data and for facilitating communication between said interface memory area and said chip card read/write apparatus;
 establishing communication between a computer and the apparatus;
 in response to a prompt from an application on the computer, inputting a PIN, and activating, with the computer's operating system, an autorun function of the first drive for read operations and loading the http responder program into the computer;
 using, with the application, standard http protocol to send a signature request containing data required for the signature, including the PIN, to the http responder, and writing the data to the interface memory area of the second drive for read/write operations with the http responder;
 reading, with the internal software of the apparatus, the memory area and interpreting the data to check whether or not the desired instruction is admissible for the given card, and if so:
  forwarding, with the internal software, the signature request via the chip card read/write apparatus to the chip card, and writing the signature created by the card to the interface memory area; and
  reading the signature from the interface memory area by the http responder and making the signature available to the application as an http response.

7. The method according to claim 6, wherein the step of establishing communication comprises, following a request from an application on the computer, plugging the apparatus into the computer using the interface.

8. The method according to claim 6, which comprises, before the signature request is forwarded to the chip card, using the configuration data to check whether or not the user requires confirmation via the operating element and, if so, writing, by the internal software, an appropriate request to the interface memory area, reading the request from the interface memory area by the http responder and displaying the request on the computer.

9. The method according to claim 8, which comprises forwarding only after the user has been confirmed using the operating element.

* * * * *